US008699951B2

(12) United States Patent
Lee

(10) Patent No.: US 8,699,951 B2
(45) Date of Patent: Apr. 15, 2014

(54) METHOD FOR PERFORMING BLUETOOTH COMMUNICATION IN WIRELESS TERMINAL

(75) Inventor: Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1469 days.

(21) Appl. No.: 11/522,981

(22) Filed: Sep. 19, 2006

(65) Prior Publication Data

US 2007/0287399 A1 Dec. 13, 2007

(30) Foreign Application Priority Data

Jun. 8, 2006 (KR) .................. 10-2006-0051502

(51) Int. Cl.
*H04B 7/00* (2006.01)
*H04B 17/00* (2006.01)

(52) U.S. Cl.
USPC ..................... 455/41.2; 455/67.11

(58) Field of Classification Search
USPC .............. 455/41.2, 41.3, 115.1, 115.3, 226.1, 455/226.2, 67.11, 25, 63.4, 134, 513
See application file for complete search history.

(56) References Cited

U.S. PATENT DOCUMENTS 6,842,621 B2 * 1/2005 Labun et al. ............... 455/456.3
7,212,499 B2 * 5/2007 Hoffmann et al. ............ 370/252
7,295,119 B2 * 11/2007 Rappaport et al. ......... 340/572.4
2004/0147267 A1 * 7/2004 Hill et al. ................... 455/456.1
2004/0166811 A1 * 8/2004 Moon ........................ 455/67.11
2004/0185791 A1 9/2004 Hammes et al.

FOREIGN PATENT DOCUMENTS

| CN | 1525669 A | 9/2004 |
|---|---|---|
| JP | 2003-023368 A | 1/2003 |
| KR | 2003-0052001 | 6/2003 |
| KR | 2004-0044220 | 5/2004 |
| KR | 20040044220 | 5/2004 |
| KR | 2004-0060459 | 7/2004 |
| KR | 2004-0110717 | 12/2004 |
| KR | 2005-0102542 | 10/2005 |

* cited by examiner

*Primary Examiner* — Eugene Yun
(74) *Attorney, Agent, or Firm* — Roylance, Abrams, Berdo & Goodman, LLP

(57) ABSTRACT

Provided is a method for performing a Bluetooth communication in a wireless terminal. The method includes steps of in a Bluetooth performance optimization mode of the wireless terminal, designating an orientation or direction in which the wireless terminal is to be positioned corresponding to a Bluetooth device to communicate with the wireless terminal; measuring and storing a received signal strength indication (RSSI) of the wireless terminal positioned in the designated orientation or direction; repeatedly performing the above steps while storing the RSSI associated with each orientation or direction in which the wireless terminal is positioned; and displaying the RSSI associated with each orientation or direction in which the wireless terminal is positioned.

33 Claims, 5 Drawing Sheets

METHOD FOR PERFORMING BLUETOOTH COMMUNICATION IN WIRELESS TERMINAL

CROSS-REFERENCE TO RELATED APPLICATION

This application claims the benefit under 35 U.S.C. §119 (a) to an application entitled "Method For Performing Bluetooth Communication In Wireless Terminal" filed in the Korean Intellectual Property Office on Jun. 8, 2006 and assigned Serial No. 2006-51502, the entire disclosure of which is hereby incorporated by reference.

BACKGROUND OF THE INVENTION

1. Field of the Invention

The present invention relates generally to a method for performing a Bluetooth communication in a wireless terminal. More particularly, the present invention relates to a method for performing a Bluetooth communication in a wireless terminal, in an optimal orientation and/or direction in which a received signal strength indication (RSSI) is above a certain level.

2. Description of the Related Art

A Bluetooth antenna is used for performing a Bluetooth communication in a wireless terminal and is smaller in size than the wireless terminal. As a result, the Bluetooth antenna is typically positioned and mounted at an edge of the wireless terminal.

Due to structural components (such as liquid crystal display (LCD), radio frequency (RF) shield, or the like) of the wireless terminal, the Bluetooth antenna does not have uniform gain in all directions.

Further, the Bluetooth antenna may have a gain deviation depending on the opening or closing of a folder of the wireless terminal. Also, the gain of Bluetooth antenna may depend on an orientation and/or direction of the wireless terminal relative to a Bluetooth headset that is in the Bluetooth communication with the wireless terminal.

As a result, there is a drawback in that, since the Bluetooth antenna is small and is positioned at the edge of the wireless terminal, the antenna has a great gain deviation in radiation performance that depends on orientation and/or direction.

Accordingly, there is a need for an improved method for performing a Bluetooth communication.

SUMMARY OF THE INVENTION

Exemplary embodiments of the present invention address at least the above problems and/or disadvantages and provide at least the advantages described below. Accordingly, an aspect of the present invention is to provide a method for performing a Bluetooth communication in a wireless terminal, in an optimal orientation and/or direction in which a received signal strength indication (RSSI) is above a certain level.

It is another aspect of an exemplary embodiment of the present invention to provide a method for performing a Bluetooth communication in a wireless terminal, for analyzing a proper characteristic of each wireless terminal so that a user can optimize its function, thereby maximizing a Bluetooth performance.

To achieve the above and other objects, there is provided a method for performing a Bluetooth communication in a wireless terminal. The method includes the steps of in a Bluetooth performance optimization mode of the wireless terminal, designating an orientation or direction in which the wireless terminal is to be positioned corresponding to a Bluetooth device to communicate with the wireless terminal; measuring and storing a received signal strength indication (RSSI) of the wireless terminal positioned in the designated orientation or direction; repeatedly performing the above steps while storing the RSSI associated with each orientation or direction in which the wireless terminal is positioned; and displaying the RSSI associated with each orientation or direction in which the wireless terminal is positioned.

In another aspect of an exemplary embodiment of the present invention, there is provided a method for performing a Bluetooth communication in a wireless terminal. The method includes steps of in a Bluetooth performance optimization mode of the wireless terminal, sensing whether or not the wireless terminal moves around a Bluetooth device; upon the sensing of the moving of the wireless terminal, measuring and storing the RSSI of each orientation or direction depending on the movement of the wireless terminal; and displaying the RSSI associated with each orientation or direction depending on the turning of the wireless terminal.

In a further aspect of an exemplary embodiment of the present invention, there is provided a method for performing a Bluetooth communication in a wireless terminal. The method includes steps of in a Bluetooth communication execution mode of the wireless terminal, measuring an RSSI with regard to signal received from a Bluetooth device that is communicating with the wireless terminal; determining whether or not the measured RSSI is lower than at least one previously stored RSSI; and when the measured RSSI is less than the at least one previously stored RSSI, informing that the measured RSSI is low.

In an additional aspect of exemplary embodiments of the present invention, there is provided a computer-readable medium having embodied thereon a computer program for executing a method for performing any of the above methods.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
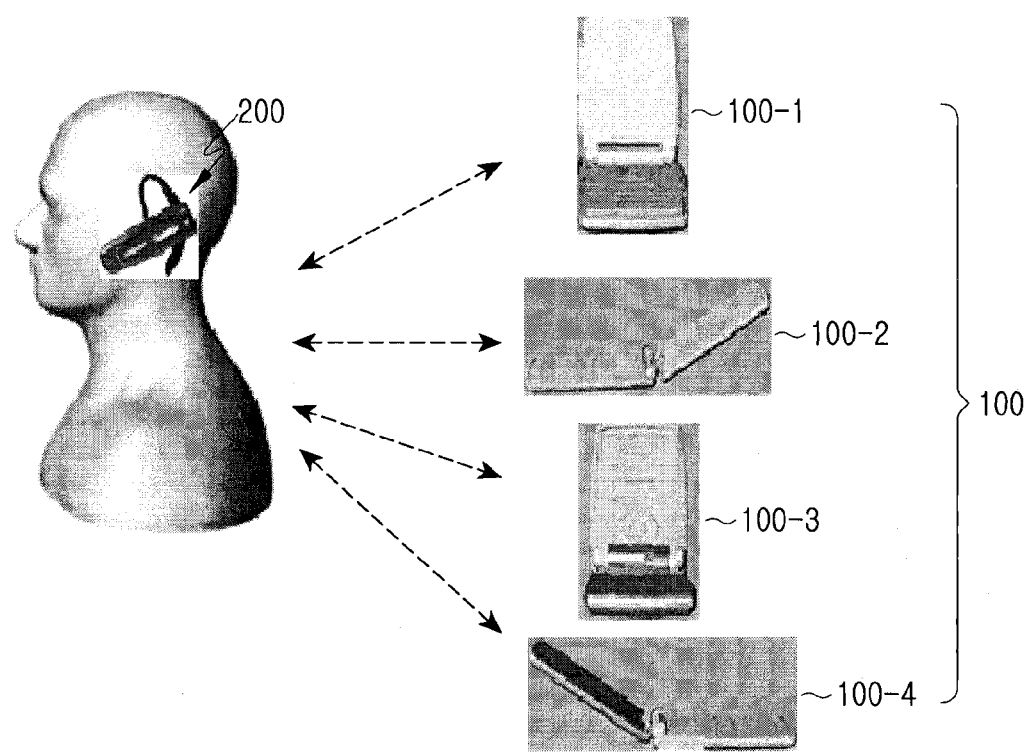
FIG. 1 illustrates a Bluetooth communication executed between a wireless terminal and a Bluetooth headset according to an exemplary embodiment of the present invention.

FIG. 1 illustrates a Bluetooth communication executed between a wireless terminal and a Bluetooth headset according to an exemplary embodiment of the present invention.

Referring to FIG. 1, the wireless terminal 100 includes a Bluetooth (BT) module, and executes the Bluetooth communication with a Bluetooth device 200 using the Bluetooth module. When performing the Bluetooth communication with the Bluetooth device 200, the wireless terminal 100 determines an optimal orientation for the wireless terminal 100 and/or direction from which a received signal strength indication (RSSI) is above a certain level so as to have at least adequate Bluetooth communication performance. Preferably, the optimal orientation and/or direction is determined so as to have a maximized RSSI. The wireless terminal 100 is then positioned in the optimal orientation and/or direction, and performs the Bluetooth communication with the Bluetooth device 200.

The Bluetooth device 200 includes a Bluetooth module. The Bluetooth device 200 performs the Bluetooth communication with the wireless terminal 100 positioned in the optimal orientation and/or direction in which the RSSI is above a certain level, using the Bluetooth module. In an exemplary embodiment of the present invention, a description will be made on the assumption that the Bluetooth device 200 is the Bluetooth headset.

Figure 2:
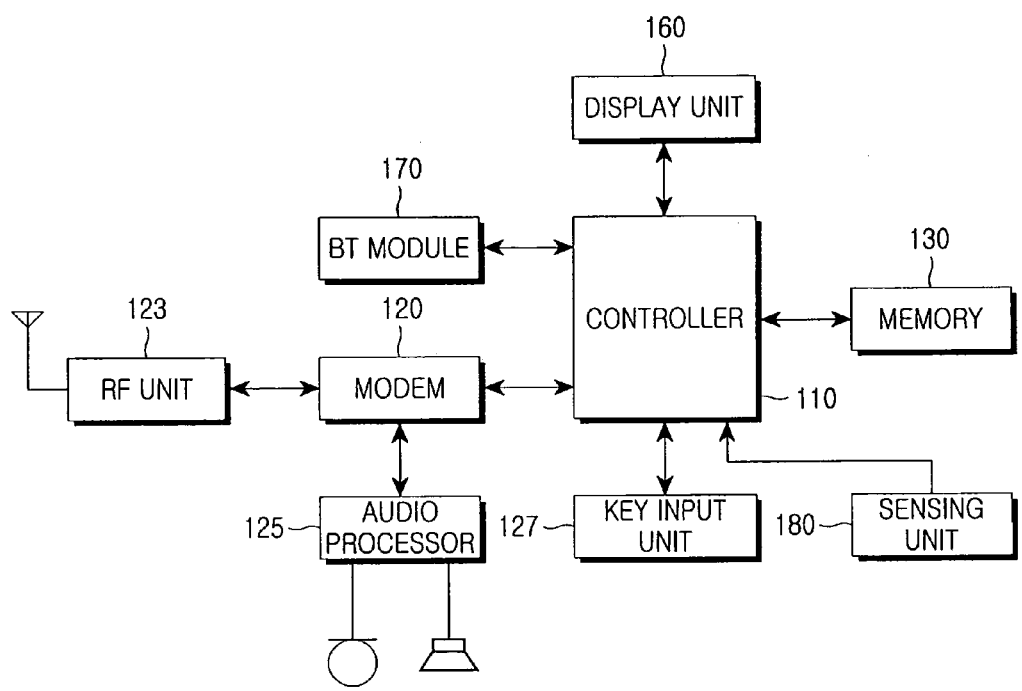
FIG. 2 illustrates a construction of a wireless terminal according to an exemplary embodiment of the present invention.

FIG. 2 illustrates a construction of the wireless terminal according to an exemplary embodiment of the present invention.

Referring to FIG. 2, a radio frequency (RF) unit 123 performs a wireless communication function of the wireless terminal. The RF unit 123 includes an RF transmitter for up converting a frequency of a transmission signal and amplifying the transmission signal, and an RF receiver for low-noise amplifying a reception signal and down converting a frequency of the reception signal. The RF receiver of the RF unit 123 can measure the RSSI for the reception signal. In a Bluetooth performance optimization mode, the RF receiver of the RF unit 123 can measure the RSSI for a signal, which is received through an antenna, under the control of a controller 110.

A modulator/demodulator (MODEM) 120 includes a transmitter for encoding and modulating the transmission signal, and a receiver for demodulating and decoding the reception signal.

An audio processor 125 can include a codec. The codec includes a data codec for processing packet data, and an audio codec for processing an audio signal such as a voice signal. The audio processor 125 may receive a digital audio signal from the MODEM 120, convert the received digital audio signal into an analog audio signal using the audio codec, and reproduce the converted audio signal. Also, the audio processor 125 may receive an analog audio signal generated from a microphone, convert the received analog audio signal into a digital audio signal using the audio codec, and transmit the converted audio signal to the MODEM 120. The codec can be separately provided or be included in the controller 110.

The memory 130 can include a program memory and a data memory. The program memory can store programs for controlling an operation of the wireless terminal, and programs for controlling and performing the Bluetooth communication in the optimal orientation and/or direction in which the RSSI is above a certain level according to an exemplary embodiment of the present invention. The data memory temporarily stores data generated from the execution of the programs. The memory 130 includes a Bluetooth performance table for storing each orientation and/or direction of the wireless terminal 100 based on the Bluetooth headset 200 and its associated RSSI according to an exemplary embodiment of the present invention.

The controller 110 controls the general operation of the wireless terminal. The controller 110 can also include the MODEM 120 and the codec.

In the Bluetooth performance optimization mode, the controller 110 controls and stores an RSSI, which is associated with each orientation and/or direction in which the wireless terminal 100 is positioned with respect to the Bluetooth headset 200, in the Bluetooth performance table according to an exemplary embodiment of the present invention.

To inform the user of the wireless terminal 100 of the orientation and/or direction, the controller 110 may control so as to display on a display unit 160 each orientation and/or direction stored in the Bluetooth performance table and its associated RSSI. The controller 110 can control so as to display the orientation and/or direction using an image that conveys an orientation and/or direction of the wireless terminal 100 to a user. For example, a three-dimensional modeled image may be used to display the orientation and/or direction.

The controller 110 controls so as to inform a user of wireless terminal 100 to position the wireless terminal 100 in the direction in which the RSSI is highest of various directions stored in the Bluetooth performance table. Bluetooth communication is then performed.

The Bluetooth module 170 includes a Bluetooth antenna, a Bluetooth RF unit, and a Bluetooth baseband processor. The Bluetooth RF unit processes a Bluetooth signal transmitted and received through the Bluetooth antenna. The Bluetooth RF unit includes a Bluetooth RF transmitter for up converting a frequency of a Bluetooth transmission signal and amplifying the Bluetooth transmission signal, and an Bluetooth RF receiver for low-noise amplifying a Bluetooth reception signal and down converting a frequency of the Bluetooth reception signal. The Bluetooth RF receiver of the Bluetooth RF unit can measure the RSSI for the Bluetooth signal received through the Bluetooth antenna. The Bluetooth baseband processor processes a variety of host control interface data packets in a packet format, and wirelessly transmits the processed data packets using the Bluetooth RF transmitter. The Bluetooth baseband processor processes a data packet received using the Bluetooth RF receiver, to a host control interface packet.

In an exemplary embodiment of the present invention, the RSSI can be stored, together with its associated orientation and/or direction, in the Bluetooth performance table, and each orientation and/or direction and its associated RSSI stored in the Bluetooth performance table can be displayed on the display unit 160.

A sensing unit 180 senses a direction signal associated with an orientation and/or direction of the wireless terminal, and outputs the sensed orientation and/or direction signal to the controller 110. In an exemplary embodiment of the present invention, a description will be made on the assumption that the sensing unit 180 is a magnetometer for sensing three-axis (x, y, z) directions.

The display unit 160 displays user data outputted from the controller 110. The display unit 160 can employ a liquid crystal display (LCD). The display unit 160 can include an LCD controller, a memory for storing image data, and an LCD display element. The LCD may employ a touch screen, wherein the LCD can also operate as an input unit. In an exemplary embodiment of the present invention, the display unit 160 can display the RSSI, which is stored in the Bluetooth performance table, associated with each orientation and/or direction in which the wireless terminal is positioned. Each orientation and/or direction in which the wireless terminal is positioned can be displayed using an image that conveys an orientation and/or direction of the wireless terminal 100 to a user.

A key input unit 127 includes keys for inputting alphanumeric information, and function keys for setting a variety of functions.

A Bluetooth performance optimizing method for determining the optimal orientation and/or direction in which the wireless terminal 100 can maximize the performance of the Bluetooth communication with the Bluetooth headset 200 will be described in detail with reference to FIGS. 3 and 4.

Figure 3:
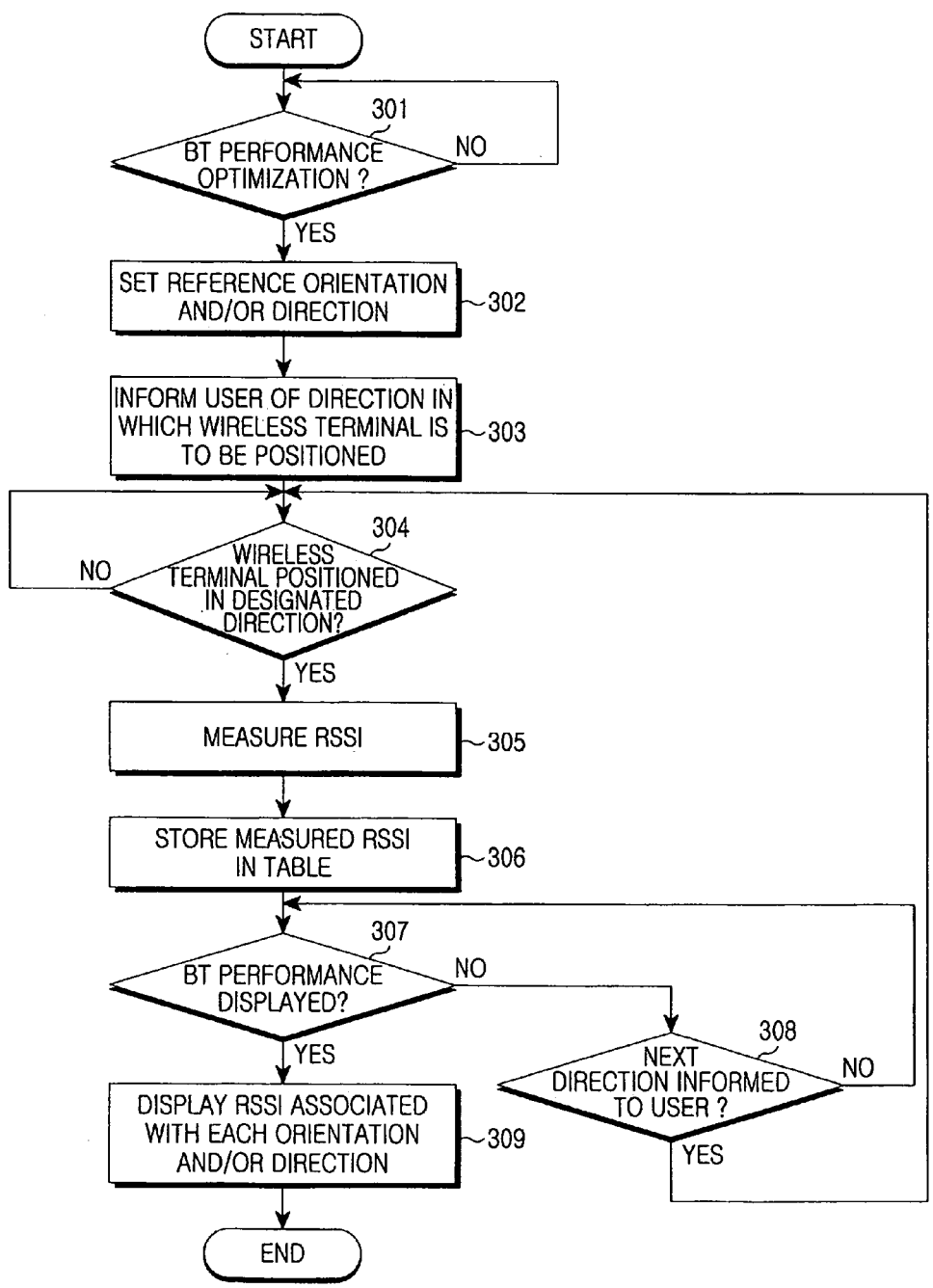
FIG. 3 is a flowchart illustrating a method for optimizing Bluetooth performance in a wireless terminal according to a first exemplary embodiment of the present invention.

FIG. 3 is a flowchart illustrating the method of optimizing the Bluetooth performance of the wireless terminal according to a first exemplary embodiment of the present invention. FIG. 3 shows the method for positioning the wireless terminal in an orientation and/or direction designated by the wireless terminal, and measuring the RSSI in the designated direction. In the first exemplary embodiment of the present invention, it will be exemplified that the Bluetooth module measures the RSSI.

The Bluetooth performance optimization method according to the first exemplary embodiment of the present invention will be described in detail with reference to FIGS. 1 and 2 below.

Referring to FIG. 3, if a Bluetooth performance optimization is selected in the wireless terminal 100, the controller 110 detects the Bluetooth performance optimization in Step 301, and sets the reference orientation and/or direction between the wireless terminal 100 and the Bluetooth headset 200 to perform the Bluetooth communication in Step 302. In the Step 302, the reference orientation and/or direction can be a current position between the wireless terminal 100 and the Bluetooth headset 200, or can be set by a user as a user defined position between the wireless terminal 100 and the Bluetooth headset 200.

Upon the setting of the reference orientation and/or direction in the Step 302, the controller 110 controls a orientation and/or direction to be displayed on display unit 160 in which the wireless terminal 100 is to be positioned, in Step 303. In the Step 303, the controller 110 can control so as to display the orientation and/or direction in which the wireless terminal is to be positioned, by using an image, together with an audio or text instruction to change the orientation and/or direction of the wireless terminal 100 from the reference orientation and/or direction. For example, a message of "Position in eight o'clock direction" could be displayed and/or audibly produced. In FIG. 1, reference numerals 100-1 to 100-4 denote exemplary displayed images of wireless terminal, for informing the user of the orientation and/or direction in which the wireless terminal is to be positioned in the Step 303.

When the user positions the wireless terminal 100 in the direction that is informed to the user in the Step 303, the controller 110 senses the position using the direction signal of the wireless terminal 100 outputted from the sensing unit 180 in Step 304, and receives the RSSI measured using the Bluetooth RF unit of the Bluetooth module 170 in Step 305.

The controller 110 controls so as to store the RSSI measured using the Bluetooth RF unit of the Bluetooth module 170, together with the direction in which the wireless terminal 100 is currently positioned, in the Bluetooth performance table in Step 306.

If not all of the directions in which the wireless terminal 100 is to be positioned for the Bluetooth performance optimization have been positioned, the controller 110 informs the users of the next orientation and/or direction in which the wireless terminal is to be positioned, in Steps 307 and 308.

While performing the Steps 304 to 308, the controller 110 controls and stores the respective orientations and/or directions in which the wireless terminal 100 is positioned, and the respective RSSIs measured in the respective orientations and/or directions, in the Bluetooth performance table. In the Step 307, the controller 110 determines if the Bluetooth performance optimization mode is complete.

After the Bluetooth performance optimization mode is complete, if an orientation and/or direction is selected to optimize Bluetooth performance, the controller 110 controls the wireless terminal 100 to operate in a Bluetooth performance display mode.

In the Bluetooth performance display mode, the controller 110 controls and displays the respective orientations and/or directions in which the wireless terminal 100 is positioned and which are stored in the Bluetooth performance table, and the respective RSSIs measured in the orientations and/or directions, on the display unit 160, in Step 309.

In the Step 309, the controller 110 can display the respective orientations and/or directions in which the wireless terminal 100 is positioned, by using an image, or can only display the orientation and/or direction in which the RSSI is highest.

When the wireless terminal 100 is positioned in the orientation and/or direction in which the RSSI is highest, among the respective orientations and/or directions and their associated respective RSSIs are displayed in the Bluetooth performance display mode, the controller 110 can control and sense it using the direction signal outputted from the sensing unit 180. Further, the controller 110 can automatically convert the wireless terminal 100 to a Bluetooth communication executing mode to enable Bluetooth communications with the Bluetooth headset 200.

Figure 4:
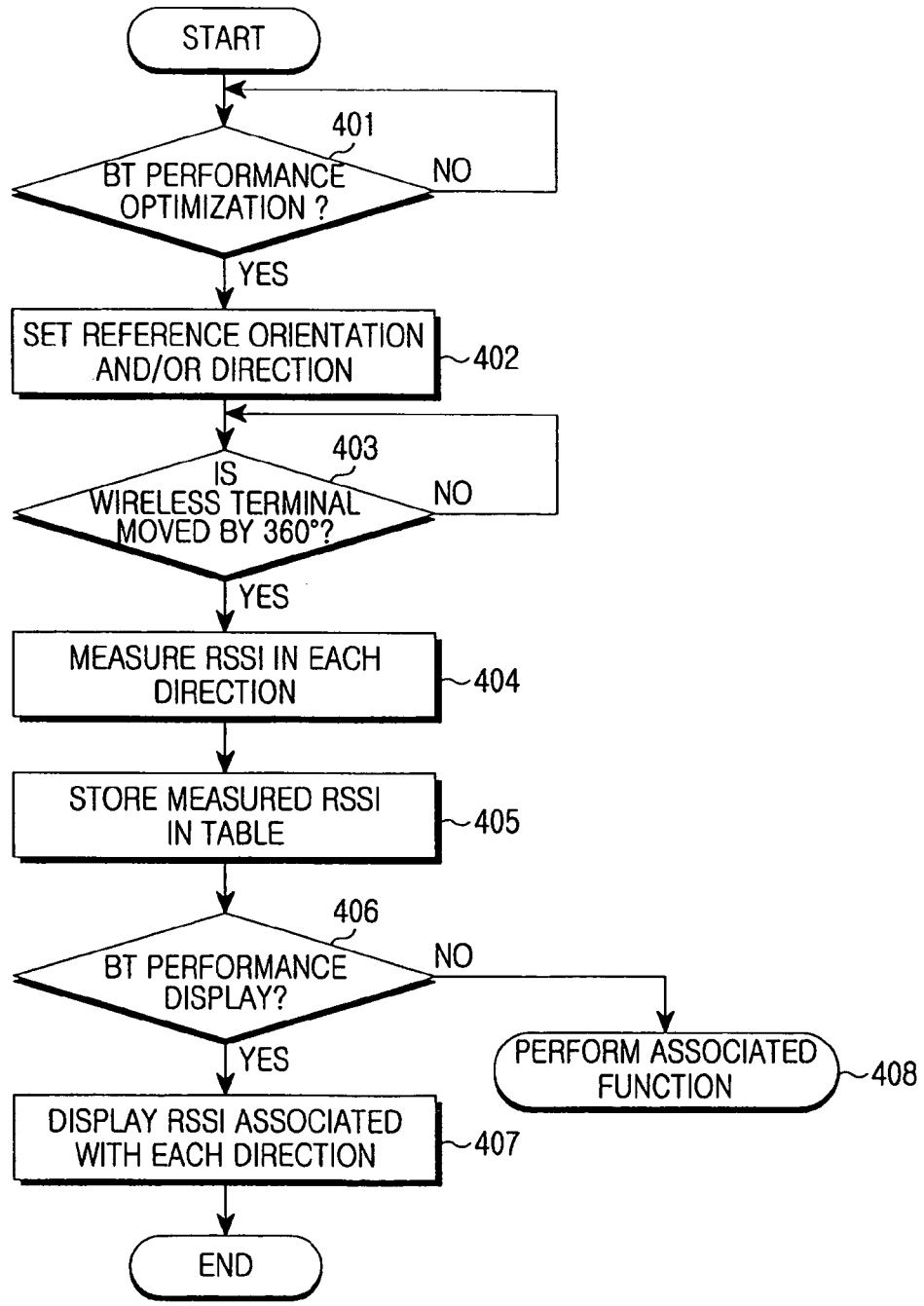
FIG. 4 is a flowchart illustrating a method for optimizing Bluetooth performance in a wireless terminal according to a second exemplary embodiment of the present invention.

FIG. 4 is a flowchart illustrating a method of optimizing a Bluetooth performance in a wireless terminal according to a second exemplary embodiment of the present invention. FIG. 4 shows the method for measuring an RSSI in a orientation and/or direction in which a user positions the wireless terminal. In the second exemplary embodiment of the present invention, it will be exemplified that a Bluetooth module measures the RSSI.

The Bluetooth performance optimization method according to the second exemplary embodiment of the present invention will be described in detail with reference to FIGS. 1 and 2 below.

Referring to FIG. 4, if a Bluetooth performance optimization is selected in the wireless terminal 100, the controller 110 detects the Bluetooth performance optimization in Step 401, and sets a reference orientation and/or direction between the wireless terminal 100 and the Bluetooth headset 200 to perform the Bluetooth communication in Step 402. In the Step 402, the reference orientation and/or direction can be a current position between the wireless terminal 100 and the Bluetooth headset 200, or can be set by a user as a user defined position between the wireless terminal 100 and the Bluetooth headset 200.

Upon setting the reference orientation and/or direction in the Step 402, the controller 110 controls so as to displays on the display unit 160 a message to the user of the wireless terminal 100 to circle the wireless terminal 100 360° around the Bluetooth headset 200.

Alternately, without setting the reference orientation and/or direction of the Step 402, the controller 110 can control so as to display on the display unit 160 the message to the user of the wireless terminal 100 to circle the wireless terminal 100 360° around the Bluetooth headset 200.

If the wireless terminal 100 is moved 360° around the Bluetooth headset 200 within a certain amount of time, the controller 110 senses it in Step 403. While the wireless terminal 100 is being moved, the controller 110 measures the respective orientations and/or directions in which the wireless terminal 100 is positioned, and the respective RSSIs measured in the orientations and/or directions, in Step 404.

In the Step 404, the controller 110 senses the respective orientations and/or directions in which the wireless terminal 100 is positioned, using the direction signal outputted from the sensing unit 180, on a per-position basis or on a per-time basis. Whenever sensing the orientations and/or direction in which the wireless terminal 100 is positioned, the controller 110 receives the RSSI measured by the Bluetooth RF unit of the Bluetooth module 170.

The controller 110 controls so as to store the RSSIs measured by the Bluetooth RF unit of the Bluetooth module 170 and their associated respective orientations and/or directions, in the Bluetooth performance table, in Step 405. In the Step 406, the controller 110 determines if the Bluetooth performance optimization mode is complete.

After the Bluetooth performance optimization mode is complete, if an orientation and/or direction is selected to optimize Bluetooth performance, the controller 110 controls the wireless terminal to operate in a Bluetooth performance display mode.

In the Bluetooth performance display mode, the controller 110 controls and displays each orientation and/or direction in which the wireless terminal 100 is positioned and which is stored in the Bluetooth performance table, and each RSSI measured in the orientation and/or direction, on the display unit 160, in Step 407.

In the Step 407, the controller 110 can display each orientation and/or direction in which the wireless terminal 100 is positioned, by using an image, or can only display the orientations and/or direction in which the RSSI is highest.

If in Step 406 the Bluetooth performance optimization mode is not complete, the associated function is performed in Step 408.

When the wireless terminal 100 is positioned in the orientation and/or direction in which the RSSI is highest, among the respective orientations and/or directions and their associated respective RSSIs are displayed in the Bluetooth performance display mode, the controller 110 can control and sense it using the direction signal outputted from the sensing unit 180. Further, the controller 110 can automatically convert the wireless terminal 100 to a Bluetooth communication executing mode to enable Bluetooth communications with the Bluetooth headset 200.

A method of performing the Bluetooth communication after the ending of the Bluetooth performance optimization functions executed between the wireless terminal 100 and the Bluetooth headset 200 shown in FIGS. 3 and 4 will be in detail described with reference to FIG. 5.

Figure 5:
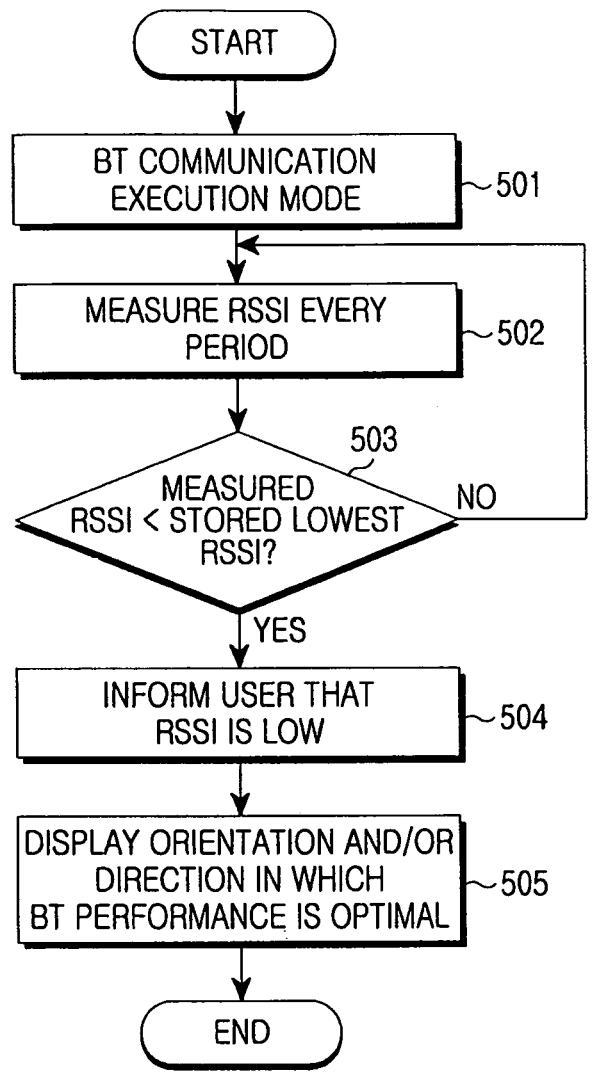
FIG. 5 is a flowchart illustrating a method of performing a Bluetooth communication in a wireless terminal according to an exemplary embodiment of the present invention.

FIG. 5 is a flowchart illustrating the method of performing the Bluetooth communication in the wireless terminal according to an exemplary embodiment of the present invention.

The method according to an exemplary embodiment of the present invention will be in detail described with reference to FIGS. 1 and 2 below.

Referring to FIG. 5, the controller 110 performs the Bluetooth communication between the wireless terminal 100 and the Bluetooth headset 200 in a Bluetooth communication execution mode in Step 501, and measures the RSSI at each predetermined period in Step 502.

Upon the measurement of the RSSI in the Step 502, the controller 110 senses the RSSI, and searches the RSSIs stored in the Bluetooth performance table. When the measured RSSI is lower than the lowest RSSI stored in the Bluetooth performance table, the controller 110 senses it in Step 503, and informs the user that the current RSSI is low in Step 504. In an exemplary embodiment of the present invention, it is exemplified that only when the RSSI measured at each predetermined period is lower than the lowest RSSI stored in the Bluetooth performance table, the controller 110 informs the user that the current RSSI is low. However, depending on user's setting, when the RSSI measured at each predetermined period is lower than the highest RSSIs stored in the Bluetooth performance table, the controller 110 can also inform the user that the current RSSI is low. Alternatively, when the measured RSSI at each predetermined period is lower than a certain level, the controller 110 informs the user that the current RSSI is low. The certain level may be user defined or defined by the manufacturer of the wireless terminal 100. Further, the certain level may be fixed or may be adaptably determined by the controller.

In the Step 504, the controller 110 can inform the user that the RSSI is low, using various functions such as a message and an alarm, and not only the wireless terminal 100 but also the Bluetooth headset 200 can also inform of it. The message and alarm by produced as audio, text, video or an image.

After informing that the RSSI is low in the Step 504, the controller 110 controls so as to display the orientation and/or direction having a highest RSSI stored in the Bluetooth performance table, on the display unit 160, in Step 505. In the Step 505, the controller 110 can control so as to display the direction having the highest RSSI using an image.

As described above, in exemplary embodiments of the present invention, when performing the Bluetooth communication with the Bluetooth device, the wireless terminal can perform the Bluetooth communication in the optimal orientation and/or direction in which the RSSI is above a certain level.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A method for performing a Bluetooth communication in a wireless terminal, the method comprising steps of:
   (a) in a Bluetooth performance optimization mode of the wireless terminal, designating, by the wireless terminal, a spatial orientation in which the wireless terminal is to be positioned relative to a Bluetooth device communicating with the wireless terminal;
   (b) measuring and storing a received signal strength indication (RSSI) of the wireless terminal positioned in the designated spatial orientation for a signal received from the Bluetooth device; and
   (c) repeatedly performing steps (a)-(b) for different spatial orientations designated by the wireless terminal while storing the RSSI associated with each designated spatial orientation in which the wireless terminal is positioned relative to the Bluetooth device.

2. The method of claim 1, wherein the step of designating the spatial orientation comprises steps of:
   in the Bluetooth performance optimization mode of the wireless terminal, setting a reference spatial orientation between the wireless terminal and the Bluetooth device; and
   changing the spatial orientation of the wireless terminal from the reference spatial orientation while designating the spatial orientation in which the wireless terminal is to be positioned.

3. The method of claim 2, wherein the reference spatial orientation is set by a user, or is set automatically.

4. The method of claim 1, wherein the step of measuring and storing the RSSI comprises steps of:
   measuring the RSSI of the wireless terminal positioned in the designated spatial orientation; and
   storing the measured RSSI in a Bluetooth performance table correspondingly to the designated spatial orientation.

5. The method of claim 4, further comprising a step of determining whether or not the wireless terminal is positioned in the designated spatial orientation.

6. The method of claim 1, further comprising a step of, when the wireless terminal is positioned in a spatial orientation in which the RSSI is above a certain level, initiating a Bluetooth communication execution mode either automatically or by a user's selection.

7. The method of claim 1, further comprising:
   (d) displaying the RSSI associated with at least one spatial orientation in which the wireless terminal is positioned.

8. The method of claim 1, further comprising steps of:
   (e) in a Bluetooth communication execution mode of the wireless terminal, measuring an RSSI with regard to a signal received from a Bluetooth device that is communicating with the wireless terminal;
   (f) determining whether or not the measured RSSI is lower than at least one RSSI previously measured using step (e) and stored in the wireless terminal; and
   (g) when the measured RSSI is less than the at least one previously stored RSSI, informing that the measured RSSI is low.

9. The method of claim 8, wherein the at least one previously stored RSSI is stored in a Bluetooth performance table, wherein the Bluetooth performance table stores an RSSI associated with each of a plurality of spatial orientations in which the wireless terminal is positioned corresponding to the Bluetooth device.

10. The method of claim 8, further comprising a step of, when the measured RSSI is greater than the at least one of the previously stored RSSIs, measuring the RSSI at each of a plurality of periods.

11. The method of claim 8, wherein any one of the wireless terminal and the Bluetooth device informs that the RSSI is low.

12. The method of claim 8, further comprising a step of, after informing that the RSSI is low, informing of the spatial orientation in which an RSSI is greater than the measured RSSI.

13. The method of claim 1, further comprising a step of:
   when the wireless terminal is sensed to be positioned relative to the Bluetooth device in the spatial orientation whose RSSI is the highest according to the stored RSSIs, automatically converting the wireless terminal from the Bluetooth performance optimization mode to a Bluetooth execution mode so as to enable the wireless terminal to conduct Bluetooth communications with the Bluetooth device.

14. A method for performing a Bluetooth communication in a wireless terminal, the method comprising steps of:
   in a Bluetooth performance optimization mode of the wireless terminal, instructing, by the wireless terminal, a user to sequentially position the wireless terminal in a plurality of spatial orientations relative to a Bluetooth device; and
   upon sensing that the wireless terminal is being positioned relative to the Bluetooth device, measuring and storing RSSIs associated with respective spatial orientations in which the wireless terminal is positioned relative to the Bluetooth device for a signal received from the Bluetooth device;
   wherein RSSIs associated with at least two different spatial orientations in which the wireless terminal is positioned relative to the Bluetooth device are measured and stored.

15. The method of claim 14, further comprising a step of setting a reference spatial orientation between the wireless terminal and the Bluetooth device.

16. The method of claim 15, wherein the reference spatial orientation is set by a user or is set automatically.

17. The method of claim 14, wherein the step of measuring and storing the RSSI comprises steps of:
   measuring the RSSI of each spatial orientation depending on the spatial orientation of the wireless terminal relative to the Bluetooth device; and
   storing the measured RSSI in a Bluetooth performance table correspondingly to the spatial orientation.

18. The method of claim 14, further comprising a step of, when the wireless terminal is positioned in a direction in which the RSSI is above a certain level, initiating a Bluetooth communication execution mode either automatically or by a user's selection.

19. The method of claim 14, further comprising:
   displaying the RSSI associated with at least one spatial orientation.

20. The method of claim 14, further comprising steps of:
(a) in a Bluetooth communication execution mode of the wireless terminal, measuring an RSSI with regard to a signal received from a Bluetooth device that is communicating with the wireless terminal;
(b) determining whether or not the measured RSSI is lower than at least one RSSI previously measured using step (a) and stored in the wireless terminal; and
(c) when the measured RSSI is less than the at least one previously stored RSSI, informing that the measured RSSI is low.

21. The method of claim 20, wherein the at least one previously stored RSSI is stored in a Bluetooth performance table, wherein the Bluetooth performance table stores an RSSI associated with each of a plurality of spatial orientations in which the wireless terminal is positioned corresponding to the Bluetooth device.

22. The method of claim 20, further comprising a step of, when the measured RSSI is greater than the at least one of the previously stored RSSIs, measuring the RSSI at each of a plurality of periods.

23. The method of claim 20, wherein any one of the wireless terminal and the Bluetooth device informs that the RSSI is low.

24. The method of claim 20, further comprising a step of, after informing that the RSSI is low, informing of the spatial orientation in which an RSSI is greater than the measured RSSI.

25. The method of claim 14, further comprising a step of:
when the wireless terminal is sensed to be positioned relative to the Bluetooth device in the spatial orientation whose RSSI is the highest according to the stored RSSIs, automatically converting the wireless terminal from the Bluetooth performance optimization mode to a Bluetooth execution mode so as to enable the wireless terminal to conduct Bluetooth communications with the Bluetooth device.

26. A non-transitory computer-readable medium having embodied thereon a computer program for executing a method for performing a Bluetooth communication in a wireless terminal, the method comprising:
(a) in a Bluetooth performance optimization mode of the wireless terminal, designating, by the wireless terminal, a spatial orientation in which the wireless terminal is to be positioned relative to a Bluetooth device to communicate with the wireless terminal;
(b) measuring and storing a received signal strength indication (RSSI) of the wireless terminal positioned in the designated spatial orientation for a signal received from the Bluetooth device; and
(c) repeatedly performing steps (a)-(b) for different spatial orientations designated by the wireless terminal while storing the RSSI associated with each spatial orientation in which the wireless terminal is positioned relative to the Bluetooth device.

27. The non-transitory computer-readable medium of claim 26, wherein the method further comprises:
(d) displaying the RSSI associated with at least one spatial orientation in which the wireless terminal is positioned.

28. The non-transitory computer-readable medium of claim 26, wherein the method further comprises:
(e) in a Bluetooth communication execution mode of the wireless terminal, measuring an RSSI with regard to signal received from a Bluetooth device that is communicating with the wireless terminal;
(f) determining whether or not the measured RSSI is lower than at least one RSSI previously measured using step (e) and stored in the wireless terminal; and
(g) when the measured RSSI is less than the at least one previously stored RSSI, informing that the measured RSSI is low.

29. The non-transitory computer-readable medium of claim 26, wherein the method further comprises:
when the wireless terminal is sensed to be positioned relative to the Bluetooth device in the spatial orientation whose RSSI is the highest according to the stored RSSIs, automatically converting the wireless terminal from the Bluetooth performance optimization mode to a Bluetooth execution mode so as to enable the wireless terminal to conduct Bluetooth communications with the Bluetooth device.

30. A non-transitory computer-readable medium having embodied thereon a computer program for executing a method for performing a Bluetooth communication in a wireless terminal, the method comprising:
in a Bluetooth performance optimization mode of the wireless terminal, instructing, by the wireless terminal, a user to sequentially position the wireless terminal in a plurality of spatial orientations relative to a Bluetooth; and
upon sensing that the wireless terminal is being positioned relative to the Bluetooth device, measuring and storing RSSIs associated with respective spatial orientations in which the wireless terminal is positioned relative to the Bluetooth device for a signal received from the Bluetooth device;
wherein RSSIs associated with at least two different spatial orientations in which the wireless terminal is positioned relative to the Bluetooth device are measured and stored.

31. The non-transitory computer-readable medium of claim 30, wherein the method further comprises:
displaying the RSSI associated with at least one spatial orientation depending on the moving of the wireless terminal.

32. The non-transitory computer-readable medium of claim 30, wherein the method further comprises:
(a) in a Bluetooth communication execution mode of the wireless terminal, measuring an RSSI with regard to signal received from a Bluetooth device that is communicating with the wireless terminal;
(b) determining whether or not the measured RSSI is lower than at least one RSSI previously measured using step (a) and stored in the wireless terminal; and
(c) when the measured RSSI is less than the at least one previously stored RSSI, informing that the measured RSSI is low.

33. The non-transitory computer-readable medium of claim 30, wherein the method further comprises:
when the wireless terminal is sensed to be positioned relative to the Bluetooth device in the spatial orientation whose RSSI is the highest according to the stored RSSIs, automatically converting the wireless terminal from the Bluetooth performance optimization mode to a Bluetooth execution mode so as to enable the wireless terminal to conduct Bluetooth communications with the Bluetooth device.

* * * * *